(12) United States Patent
Chen et al.

(10) Patent No.: US 7,612,714 B2
(45) Date of Patent: Nov. 3, 2009

(54) SATELLITE SEARCH METHOD

(75) Inventors: Kun-tso Chen, Fang-Yuan Hsiang (TW); Kung-shuan Huang, Siansi Township (TW)

(73) Assignee: MEDIATEK Inc., Hsin-Chu (TW)

( * ) Notice: Subject to any disclaimer, the term of this patent is extended or adjusted under 35 U.S.C. 154(b) by 132 days.

(21) Appl. No.: 11/392,976

(22) Filed: Mar. 28, 2006

(65) Prior Publication Data

US 2007/0229351 A1 Oct. 4, 2007

(51) Int. Cl.
*G01S 1/00* (2006.01)

(52) U.S. Cl. .................................. 342/357.15

(58) Field of Classification Search ................................
342/357.01–357.17
See application file for complete search history.

(56) References Cited

U.S. PATENT DOCUMENTS

| | | | |
|---|---|---|---|
| 5,402,347 A | 3/1995 | McBurney et al. | |
| 5,418,538 A | 5/1995 | Lau | |
| 5,535,237 A | 7/1996 | LaPadula, III et al. | |
| 5,600,670 A | 2/1997 | Turney | |
| 5,663,735 A | 9/1997 | Eshenbach | |
| 5,798,732 A | 8/1998 | Eshenbach | |
| 5,854,605 A | 12/1998 | Gildea | |
| 5,917,444 A | 6/1999 | Loomis et al. | |
| 6,184,824 B1 | 2/2001 | Bode et al. | |
| 6,191,731 B1 | 2/2001 | McBurney et al. | |
| 6,211,817 B1 | 4/2001 | Eschenbach | |
| 6,225,945 B1 | 5/2001 | Loomis | |
| 6,275,185 B1 | 8/2001 | Loomis | |
| 6,373,429 B1 | 4/2002 | Eschenbach | |
| 6,400,319 B1 | 6/2002 | Castelloe et al. | |
| 6,459,405 B1 | 10/2002 | Da et al. | |
| 6,559,793 B1 | 5/2003 | Eschenbach | |
| 6,597,988 B1 | 7/2003 | Brodie et al. | |
| 6,671,620 B1 | 12/2003 | Garin et al. | |
| 6,778,136 B2 | 8/2004 | Gronemeyer | |
| 2003/0079173 A1 | 4/2003 | Birru | |
| 2006/0077096 A1* | 4/2006 | King et al. | 342/357.15 |
| 2006/0152409 A1* | 7/2006 | Raman et al. | 342/357.15 |
| 2006/0181452 A1 | 8/2006 | King et al. | |
| 2006/0250304 A1* | 11/2006 | Mo et al. | 342/357.15 |
| 2008/0191933 A1* | 8/2008 | Wigren et al. | 342/357.1 |

\* cited by examiner

*Primary Examiner*—Thomas H Tarcza
*Assistant Examiner*—Harry Liu

(57) ABSTRACT

A method for searching satellites in a cold start state. The method of the present invention, a first satellite, which is predetermined or randomly selected, is searched. Then, a second satellite to be searched is selected according to the searching result (hit or missed) for the first satellite and respective interrelationships between the first satellite and the other satellites. In practice, an initial weight factor table is provided. Depending on the searching result, the initial weight factor table is updated according to the interrelationships between the satellites during searching. By using the method of the present invention, the time-to-first-fix (TTFF) can be reduced to a shorter period of time so as to provide a rapid cold start satellite positioning.

14 Claims, 5 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | -0.65363 | 0.052882 | -0.51739 | -0.25295 | -0.20187 | 0.52989 | -0.8882 | -0.3478 | -0.91868 | 0.066537 | 0 | -0.43302 | 0.53013 | -0.11049 | 0.089945 |
| 2 | -0.653 | 1 | 0.90223 | 0.45788 | 0.15484 | 0.047971 | -0.03185 | -0.10611 | -0.06489 | 0.41763 | -0.8058 | 0 | -0.05707 | -0.64433 | -0.78711 | -0.60457 |
| 3 | 0.054264 | -0.90228 | 1 | -0.86791 | -0.89941 | -0.42935 | -0.76592 | -0.23518 | -0.6649 | -0.63804 | 0.034853 | 0 | -0.19026 | -0.0719 | 0.29616 | 0.35592 |
| 4 | -0.51742 | 0.45512 | -0.86809 | 1 | -0.0928 | -0.3849 | 0.36125 | 0.057633 | -0.2572 | 0.023011 | -0.30767 | 0 | 0.17528 | -0.65822 | 1 | -0.65524 |
| 5 | -0.25274 | 0.15305 | -0.89951 | -0.0925 | 1 | 0.12152 | -0.10433 | -0.73811 | 0.43902 | -0.05683 | -0.68018 | 0 | -0.68646 | -0.00567 | -0.33732 | -0.71006 |
| 6 | -0.2007 | 0.047587 | -0.42926 | -0.38396 | 0.12286 | 1 | -0.7928 | -0.68963 | -0.08635 | -0.00827 | -0.94872 | 0 | -0.54983 | -0.05204 | -0.02201 | -0.00681 |
| 7 | -0.52869 | -0.03117 | -0.76563 | 0.36479 | -0.1023 | -0.79258 | 1 | 0.075414 | -0.08892 | -0.16128 | 0.039418 | 0 | -0.05421 | -0.56536 | -0.88266 | -0.92813 |
| 8 | -0.88822 | -0.10791 | -0.23632 | 0.057504 | -0.73823 | -0.69014 | 0.072497 | 1 | -0.48322 | 0.10632 | -0.09682 | 0 | 0.11693 | -0.91291 | -0.55252 | -0.43727 |
| 9 | -0.34708 | -0.06557 | -0.66497 | 0.25634 | 0.44021 | -0.08669 | -0.09023 | -0.48256 | 1 | -0.16346 | -0.56482 | 0 | -0.91884 | 0.028163 | -0.16858 | -0.84957 |
| 10 | -0.91857 | 0.41694 | -0.63803 | 0.024447 | -0.05582 | -0.00839 | -0.16228 | 0.10801 | -0.16325 | 1 | -0.85552 | 0 | -0.0347 | -0.88982 | -0.4195 | -0.54565 |
| 11 | 0.068001 | -0.80588 | 0.034916 | -0.30668 | -0.67983 | -0.94872 | 0.038213 | -0.09541 | -0.56471 | -0.85551 | 1 | 0 | -0.09462 | -0.14107 | -0.39354 | -0.24344 |
| 12 | 0 | 0 | 0 | 0 | 0 | 0 | 0 | 0 | 0 | 0 | 0 | 1 | 0 | 0 | 0 | 0 |
| 13 | -0.43302 | -0.0588 | -0.19132 | 0.17535 | -0.68655 | -0.55049 | -0.0566 | 0.11713 | -0.91892 | -0.036 | -0.09586 | 0 | 1 | -0.85224 | -0.6643 | -0.09385 |
| 14 | 0.53209 | -0.64452 | -0.07193 | 0.65777 | -0.00467 | -0.05222 | -0.5659 | -0.91278 | 0.028352 | -0.88983 | -0.14115 | 0 | -0.85205 | 1 | 0.10245 | -0.11765 |
| 15 | -0.10957 | -0.78728 | 0.2958 | -1 | -0.33681 | -0.02243 | -0.88284 | -0.55198 | -0.16863 | -0.41968 | -0.39375 | 0 | -0.66395 | 0.10218 | 1 | 0.17053 |
| 16 | 0.092075 | -0.60452 | 0.35679 | -0.65454 | -0.70957 | -0.00632 | -0.92817 | -0.43607 | -0.84944 | -0.54637 | -0.243 | 0 | -0.09208 | -0.11706 | 0.1716 | 1 |
| 17 | 0 | 0 | 0 | 0 | 0 | 0 | 0 | 0 | 0 | 0 | 0 | 0 | 0 | 0 | 0 | 0 |
| 18 | -0.30115 | -0.60565 | -0.09998 | -0.89545 | 0.005005 | 0.059082 | -0.64673 | -0.53198 | 0.21515 | -0.3396 | -0.48981 | 0 | -0.922 | 0.074463 | 0.55255 | -0.20209 |
| 19 | -0.0067192 | -0.94307 | 0.65469 | -0.75957 | -0.89561 | -0.73716 | -0.46088 | -0.08417 | -0.64388 | -0.6867 | 0.30994 | 0 | -0.12571 | -0.14733 | 0.097001 | 0.074033 |
| 20 | 0.18149 | -0.36438 | -0.17521 | 0.073828 | -0.58221 | -0.67914 | 0.018411 | -0.25404 | -0.66482 | -0.71627 | 0.34786 | 0 | 0.13107 | -0.17503 | -0.74364 | -0.12766 |
| 21 | -0.33746 | -0.3485 | -0.04731 | -0.83821 | -0.1099 | 0.33777 | -0.89086 | -0.54659 | -0.02712 | -0.04139 | -0.82406 | 0 | -0.64787 | -0.11295 | 0.51951 | 0.006192 |
| 22 | 0.033184 | -0.85457 | 0.090393 | -0.92258 | -0.14028 | -0.12385 | -0.6311 | -0.65107 | 0.042708 | -0.72421 | -0.17874 | 0 | -0.92325 | 0.38871 | 0.46576 | -0.06335 |
| 23 | -0.036621 | -0.27148 | -0.04919 | 0.006836 | -0.68109 | -0.53387 | -0.18799 | -0.19421 | -0.93329 | -0.36627 | 0.079224 | 0 | 0.58887 | -0.48926 | -0.60913 | 0.094482 |
| 24 | -0.26023 | -0.07031 | -0.58558 | 0.46863 | -0.37114 | -0.76018 | 0.51292 | 0.06238 | -0.4549 | -0.40835 | 0.20849 | 0 | 0.16957 | -0.48278 | -1 | -0.55812 |
| 25 | 0.58468 | -0.54421 | -0.04013 | -0.55898 | -0.17564 | 0.060888 | -0.69058 | -0.97717 | -0.48134 | -0.69327 | -0.19622 | 0 | -0.30267 | 0.28155 | 0.0119869 | 0.24688 |
| 26 | -0.91462 | -0.03565 | -0.55335 | -0.29276 | -0.00424 | -0.107 | -0.12938 | 0.045159 | 0.25111 | 0.20067 | -0.63885 | 0 | -0.62409 | -0.51523 | -0.14048 | -0.66757 |
| 27 | -0.71822 | -0.28896 | -0.05904 | -0.00894 | -0.90268 | -0.66568 | -0.09784 | 0.61046 | -0.8286 | -0.03499 | -0.00473 | 0 | 0.41782 | -0.92489 | -0.54151 | -0.14483 |
| 28 | -0.64819 | -0.24945 | -0.32578 | 0.023588 | -0.49658 | -0.92459 | 0.37283 | 0.43339 | -0.17618 | -0.11324 | 0.10077 | 0 | -0.08977 | -0.63462 | -0.50768 | -0.78911 |
| 29 | -1 | 0.047427 | 0.56384 | -0.20391 | -0.09525 | -0.16103 | -0.07387 | 0.18516 | 0.097084 | 0.34622 | -0.632213 | 0 | -0.44419 | -0.69131 | -0.235 | -0.6524 |
| 30 | -0.013738 | -0.0251 | -0.66669 | -0.3092 | 0.53957 | 0.44835 | -0.45434 | -0.92948 | 0.096349 | -0.20161 | -0.70625 | 0 | -0.64184 | 0.16846 | -0.13762 | -0.28398 |
| 31 | 0 | 0 | 0 | 0 | 0 | 0 | 0 | 0 | 0 | 0 | 0 | 0 | 0 | 0 | 0 | 0 |
| 32 | 0 | 0 | 0 | 0 | 0 | 0 | 0 | 0 | 0 | 0 | 0 | 0 | 0 | 0 | 0 | 0 |

FIG. 2-1

| | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|
| | 0 | -0.30202 | -0.00875 | 0.18138 | -0.33799 | 0.031546 | -0.03783 | -0.26081 | 0.58255 | -0.91466 | -0.71849 | -0.64906 | -1 | -0.01533 | 0 | 0 |
| | 0 | -0.60542 | -0.94308 | -0.36328 | -0.34783 | -0.85453 | -0.27106 | -0.06935 | -0.54399 | -0.03429 | -0.20828 | -0.24933 | 0.047299 | -0.02489 | 0 | 0 |
| | 0 | -0.09992 | 0.65348 | -0.1742 | -0.04682 | 0.090093 | -0.04914 | -0.58536 | -0.04016 | -0.55295 | -0.05872 | -0.32656 | -0.56412 | -0.66679 | 0 | 0 |
| | 0 | -0.89558 | -0.76008 | 0.073664 | -0.83835 | -0.92271 | 0.005516 | 0.46737 | -0.5596 | -0.2931 | -0.00997 | 0.020999 | -0.20551 | -0.31035 | 0 | 0 |
| | 0 | 0.004024 | -0.89579 | -0.58213 | -0.11037 | -0.1414 | -0.5814 | -0.37146 | -0.17652 | -0.00439 | -0.90274 | -0.49768 | -0.09677 | 0.5375 | 0 | 0 |
| | 0 | 0.059308 | -0.73731 | -0.6787 | 0.33866 | -0.12396 | -0.53377 | -0.76002 | 0.061018 | -0.106017 | -0.66552 | -0.92467 | -0.16144 | 0.44812 | 0 | 0 |
| | 0 | -0.64628 | -0.46061 | 0.020901 | -0.89067 | -0.63075 | -0.18695 | 0.51555 | -0.69022 | -0.12754 | -0.09644 | 0.37291 | -0.07334 | -0.46385 | 0 | 0 |
| | 0 | -0.53265 | -0.08621 | -0.25424 | -0.54704 | -0.65168 | -0.19537 | 0.061344 | -0.97721 | 0.044522 | 0.60859 | 0.42959 | 0.18263 | -0.92961 | 0 | 0 |
| | 0 | 0.21496 | -0.64422 | -0.66448 | -0.02682 | 0.042199 | -0.9333 | -0.45473 | -0.48146 | 0.25195 | -0.82858 | -0.17731 | 0.096146 | 0.09578 | 0 | 0 |
| | 0 | -0.33954 | -0.68692 | -0.71592 | -0.04087 | -0.72428 | -0.36621 | -0.40803 | -0.69327 | 0.20177 | -0.03464 | -0.11424 | 0.3454 | -0.20183 | 0 | 0 |
| | 0 | -0.48974 | 0.30906 | 0.34959 | -0.82395 | -0.17892 | 0.079355 | 0.20919 | -0.19619 | -0.63851 | -0.00433 | 0.09956 | -0.63234 | -0.70632 | 0 | 0 |
| | 0 | 0 | 0 | 0 | 0 | 0 | 0 | 0 | 0 | 0 | 0 | 0 | 0 | 0 | 0 | 0 |
| | 0 | -0.92209 | -0.1275 | 0.13097 | -0.64815 | -0.92237 | 0.58688 | 0.16864 | -0.30361 | -0.62425 | 0.41644 | -0.09202 | -0.44527 | -0.64242 | 0 | 0 |
| | 0 | 0.074496 | -0.14798 | -0.17405 | -0.11252 | 0.38829 | -0.48924 | -0.48253 | 0.28147 | -0.51482 | -0.92486 | -0.63506 | -0.69152 | 0.16807 | 0 | 0 |
| | 0 | 0.55222 | 0.095896 | -0.7434 | 0.51988 | 0.46496 | -0.60921 | -1 | 0.019558 | -0.13995 | -0.54148 | -0.60824 | -0.2357 | -0.13812 | 0 | 0 |
| | 0 | -0.20153 | 0.073935 | -0.12603 | 0.00736 | -0.063 | 0.095251 | -0.55761 | 0.24764 | -0.66706 | -0.14399 | -0.78922 | -0.6524 | -0.28374 | 0 | 0 |
| | 0 | 0 | 0 | 0 | 0 | 0 | 0 | 0 | 0 | 0 | 0 | 0 | 0 | 0 | 0 | 0 |
| | 0 | -1 | -0.22314 | -0.91345 | 0.42773 | 0.58264 | -0.93109 | -0.91156 | -0.24335 | 0.2002 | -0.66211 | -0.52148 | 0.055237 | 0.068237 | 0 | 0 |
| | 0 | -0.22253 | 1 | -0.04551 | -0.28404 | -0.00458 | -0.0025 | -0.35856 | -0.18954 | -0.55568 | 0.057724 | -0.05913 | -0.54713 | -0.83831 | 0 | 0 |
| | 0 | -0.91355 | -0.04737 | 1 | -0.92745 | -0.5599 | 0.42456 | 0.46668 | -0.01792 | -0.91264 | -0.07749 | -0.11315 | -0.8913 | -0.54386 | 0 | 0 |
| | 0 | 0.42708 | -0.28493 | -0.9274 | 1 | 0.13175 | -0.66171 | -1 | -0.11082 | 0.0769 | -0.56538 | -0.66843 | -0.0043 | 0.080072 | 0 | 0 |
| | 0 | 0.58317 | -0.00504 | -0.55924 | 0.13264 | 1 | -0.77965 | -0.73612 | -0.03086 | -0.12318 | -0.69228 | -0.54245 | -0.27912 | -0.01285 | 0 | 0 |
| | 0 | -0.93109 | -0.0033 | 0.42621 | -0.66156 | -0.77972 | 1 | 0.21454 | 0.023743 | -0.95819 | 0.11963 | -0.28101 | -0.81537 | -0.5415 | 0 | 0 |
| | 0 | -0.9116 | -0.35936 | 0.46771 | -1 | -0.73633 | 0.21398 | 1 | -0.44929 | -0.53909 | 0.094104 | 0.19141 | -0.4732 | -0.55684 | 0 | 0 |
| | 0 | -0.24328 | -0.19011 | -0.0167 | -0.11033 | -0.0311 | 0.023836 | -0.44899 | 1 | -0.88854 | -0.68265 | -0.90514 | -0.92919 | 0.17888 | 0 | 0 |
| | 0 | 0.19921 | -0.5564 | -0.91261 | 0.076506 | -0.1242 | -0.95823 | -0.53926 | -0.88864 | 1 | -0.25635 | -0.01558 | 0.80259 | -0.23873 | 0 | 0 |
| | 0 | -0.6622 | 0.056595 | -0.07667 | -0.5653 | -0.69247 | 0.11932 | 0.094304 | -0.68277 | -0.25594 | 1 | 0.15306 | -0.1034 | -0.92013 | 0 | 0 |
| | 0 | -0.5209 | -0.05873 | -0.11104 | -0.66787 | -0.54204 | -0.28013 | 0.19341 | -0.90504 | -0.01357 | 0.15479 | 1 | 0.058238 | -0.89837 | 0 | 0 |
| | 0 | 0.055978 | -0.54717 | -0.8911 | -0.00315 | -0.27885 | -0.81524 | -0.47259 | -0.92915 | 0.80534 | -0.10252 | 0.057688 | 1 | -0.32918 | 0 | 0 |
| | 0 | 0.068629 | -0.83838 | -0.54317 | 0.080962 | -0.01282 | -0.54134 | -0.55648 | 0.1792 | -0.23782 | -0.92008 | -0.89846 | -0.32941 | 1 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |

FIG. 2-2

SATELLITE SEARCH METHOD

TECHNICAL FIELD OF THE INVENTION

The present application relates to satellite communication, more particularly, to satellite search method, which is especially advantageous to a cold start satellite searching and capable of improving time-to-first-fix (TTFF).

BACKGROUND OF THE INVENTION

Satellite positioning has been widely used in various applications. In satellite communication systems such as Global Navigation Satellite System (GNSS), a cold start state means that no information such as the receiver position, observation time, satellite orbit information (e.g. almanac or ephemeris) are available. Accordingly, the identification (ID) of a visible satellite is of course unknown. In addition to the satellite ID, the Doppler frequency due to the satellite motion with respect to the user is unknown. If a Code Division Multiple Access (CDMA) signaling is used in the system, Global Positioning System (GPS) for example, the code phase of the Pseudo Random Noise (PRN) code used by a satellite is also required to track that satellite. As mentioned, the characteristic of a satellite signal can be determined by the following variables: satellite ID, Doppler frequency and PRN code phase.

At least four satellites are required to fix a three dimensional position. The required time-to-first-fix (TTFF) depends on how fast the four visible satellites can be found. For example, there may be as many as twelve GPS satellites that are visibly observed from the surface of the earth. Conventionally, all of the possible satellites are searched sequentially in order to find the visible satellites. Moreover, the Doppler frequency and PRN code phase of each satellite are also unknown. Therefore, it takes a lot of time to try all the possible values to determine a satellite's existence.

In general, a receiver searches for a visible satellite by using correlation analysis which considers satellite ID (e.g. satellites of the system GPS, Galileo, WAAS, EGNOS, MSAS etc.), code phase, and Doppler frequency. In addition, serial and parallel searches might be used. For example, four different satellites can be searched at the same time if there are four available channels. To search a satellite, all the possible code phases and Doppler frequencies thereof should be scanned.

A numerical example will be described hereinafter. Assuming that a visible GPS satellite list is {5, 9, 14, 15, 18, 21, 22, 26, 29, 30} for a receiver, which can use one physical channel and ten channels to search and track satellites, respectively. Scanning time, $T_s$, is defined as the time required to scan the whole range of possible Doppler frequencies and code phases. If a candidate satellite is not visible, a correlator misses it after searching time $T_s$. On the other hand, the correlator hits a visible satellite after searching time $\frac{1}{2} T_s$ on average. Further, it is assumed that the data demodulation bit error rate is zero. Therefore, it takes 750 sec to receive almanac after the hit of the first satellite. After the hit of one satellite, it takes 27.6 sec on average to receive its ephemeris. The scanning time, $T_s$, can be computed for a receiver that tracks GPS L1 C/A code signal, which has 1023 chips per code period. If the code resolution of code correlation in acquisition process is ½ chip, the code phase uncertainty range size is 2046. In general, a combination of coherent and incoherent integration is used in the receiver to increase the acquisition sensitivity. Therefore, the correlation period (denoted by $\Delta T$) for one particular pair of Doppler frequency and code phase candidates is the coherent time (denoted by Tc) multiplied by the incoherent count (denoted by Ti). Moreover, the Doppler frequency resolution, dF, is set to be 1/Tc in general. Finally, the whole Doppler range is denoted by $\Delta F$. Based on the above assumptions, the scanning time Ts can be computed as follows.

$$T_s = 2046 \times \frac{\Delta F}{dF} \times \Delta T \quad (1)$$
$$= 2046 \times \frac{\Delta F}{1/T_c} \times (T_i \times T_C)$$
$$= 2046 \times \Delta F \times T_i \times T_C^2$$

If the receivers uses Tc of 1 ms to perform coherent integration and no incoherent integration is used, i.e., Ti equals one, then the required scanning time Ts is 20.46 seconds to scan the Doppler range size equal to 10 kHz. Four satellites must be found to make the first position fix. Assuming that the satellite search order is 1, 2, ... ,32 for a sequential search of GPS satellites, then satellites 5, 9, 14 and 15 in the visible satellite list should be hit in order. Table 1 shows the results of sequential search.

TABLE 1

Hit results of sequential search

| SV ID | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Epoch (Ts) | 1 | 2 | 3 | 4 | 4.5 | 5.5 | 6.5 | 7.5 | 8 | 9 | 10 | 11 | 12 | 12.5 | 13 | 14 |
| Hit | 0 | 0 | 0 | 0 | 1 | 0 | 0 | 0 | 2 | 0 | 0 | 0 | 0 | 3 | 4 | 0 |
| SV ID | 17 | 18 | 19 | 20 | 21 | 22 | 23 | 24 | 25 | 26 | 27 | 28 | 29 | 30 | | |
| Epoch (Ts) | 15 | 15.5 | 16.5 | 17.5 | 18 | 18.5 | 19.5 | 20.5 | 21.5 | 22 | 23 | 24 | 24.5 | 25 | | |
| Hit | 0 | 5 | 0 | 0 | 6 | 7 | 0 | 0 | 0 | 8 | 0 | 0 | 9 | 10 | | |

The visibilities of+ the respective satellites can be obtained from observation statistics results at various time sampling points for a fixed position. FIG. 3 shows an example of observation time sampling points at a certain position. For instances, at observation time sampling point "8" of the diagram, the visible satellites are SV5, 9, 14, 15, 18, 21, 22, 26, 29 and 30.

As can be seen from Table 1, the sequential searching scheme takes 4.5 Ts (=110.07 sec) to achieve the first hit (Satellite 5 is hit), and about 13 Ts+27.6=345.58 sec to achieve the first fix (Satellites 5, 9, 14 and 15 are hit and 27.6 sec are required to collect the ephemeris of satellite 15.) To find all satellites on the visible satellite list, 25 Ts (611.5 sec) is required. These periods of hit time are undesirably long.

Accordingly, there is a need for a solution to reduce the time required to find the visible satellites.

SUMMARY OF THE INVENTION

An objective of the present invention is to provide a method for searching satellites in a cold start state. By using the method of the present invention, the time-to-first-fix (TTFF) can be reduced to a shorter period of time required to provide rapid cold start satellite positioning.

In accordance with the present invention, a first satellite, predetermined or randomly selected, is searched. Then, a second satellite to be searched is selected according to the searching results, hit or miss, of the first satellite and respective interrelationships between the first satellite and the other satellites. In practice, an initial weight factor table is provided. When one of the satellites is searched, the weight factor table is updated according to the searching result by utilizing the interrelationships between the satellites. The next satellite to be searched is selected according to the updated weight factor table.

DETAILED DESCRIPTION OF THE INVENTION

Figure 1:
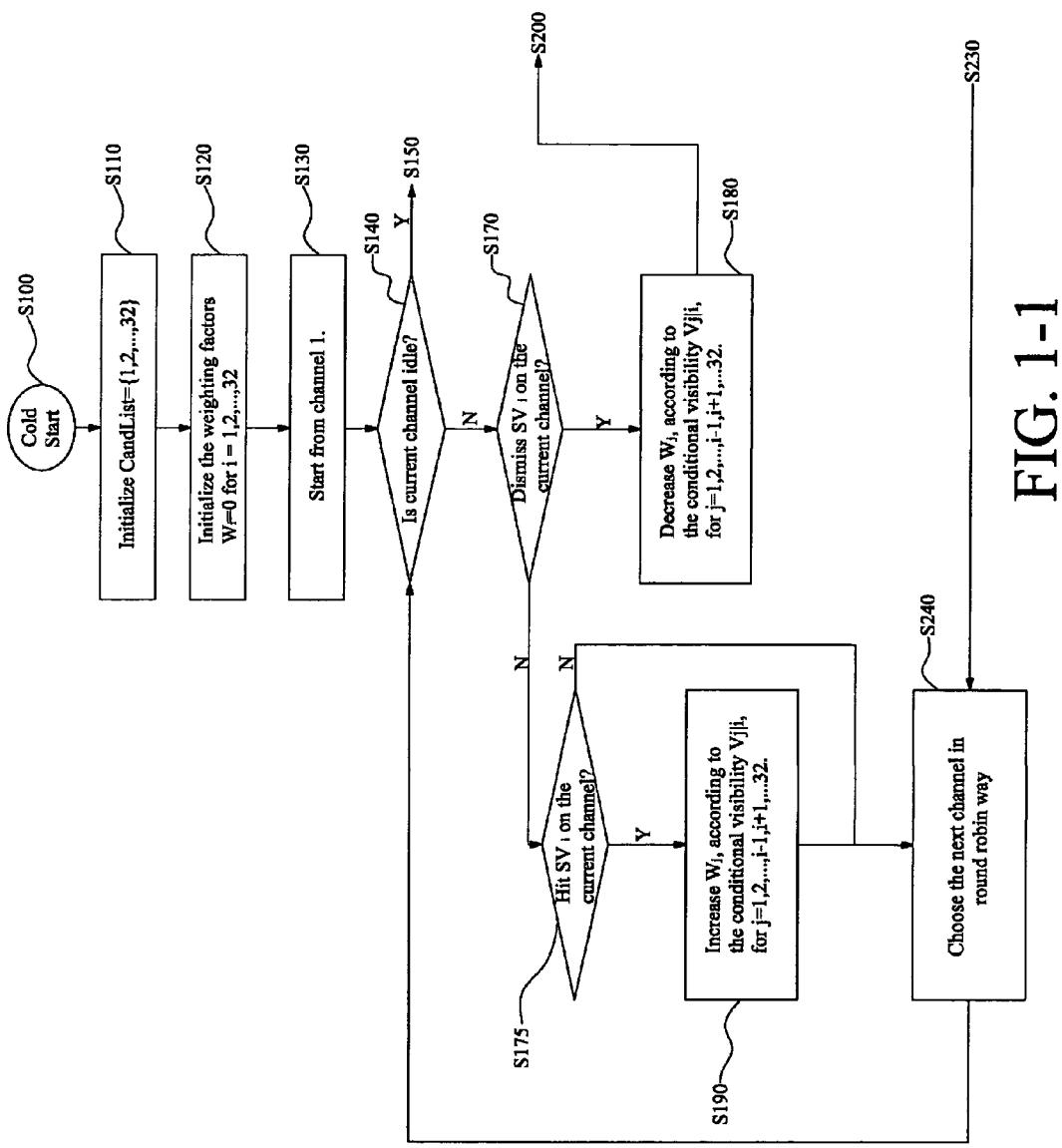
FIG. 1 is a flow chart showing an embodiment of a cold start satellite search method in accordance with the present invention.

Details of the present invention will be described as follows.

In accordance with the present invention, a cold start satellite searching is started with searching for a predetermined or randomly selected first satellite from a list of candidate satellites including all or a predetermined part of the available satellites. An initial weight factor table is previously prepared. The initial weight factors are then updated whenever a satellite is searched. The weight factors are used to determine which satellite has the highest probability that it is visible. For example, if the candidate satellite list includes satellites SV1, SV2, ..., SV32, and the searched satellite is satellite SV1, then the updated weight factors of satellites SV2 to SV32 are used to choose the next satellite to search. The weight factors can be updated according to any desired interrelationships between two satellites. In the present embodiment, the weight factors are updated according to conditional visibilities, that is, the conditional probabilities that a satellite is visible if a specific satellite is visible. An example of the conditional visibilities for satellite SV1 is shown in Table 2. The rest can be deduced in the same way. Details concerning this matter will be further described later.

If there are 32 possible satellites in the sky, we define a random variable for each satellite to indicate whether it is visible or not, that is $$X_i = \begin{cases} 1, & SV_i \text{ is visible.} \\ 0, & \text{otherwise.} \end{cases} \text{ for } i = 1, 2, K, 32 \qquad (2)$$

The random variable $X_i$ depends on the receiver position, observation time and the satellite position. If an almanac is known in advance, we can compute Xi(r,t) for each possible receiver position, r, and observation time, t. For example, we can divide 24 hours into 96 time points (i.e. one point per 15 min), and divides the global surface into 1808 points as is done in WAAS IGP grid point definition. Then $X_i$ is computed for all the 96*1808 possible combinations of the receiver position and observation time. Finally, the ensemble average of $X_i$ for i=1, 2, ...,32 can be obtained as follows $$E[X_i] = \sum_{j=1}^{1808} \sum_{k=1}^{96} X_i(r_j, t_k) \qquad (3)$$

It is noted that the ensemble average, E[Xi], can be interpreted as the probability that satellite SVi is visible, that is, E[Xi] equals 1*Pr[SVi is visible] according to Eq. (2).

If a satellite is visible at a position and time point, we can also determine which satellites are also visible under such a situation. Therefore, we can define the following conditional random variable for i,j=1, 2, ...,32

$$X_{j|i} = \begin{cases} 1, & SV_j \text{ is available if } SV_i \text{ is visible.} \\ 0, & \text{otherwise.} \end{cases} \qquad (4)$$

The mean of Xj|i can be used as the interrelationship between two satellites because E[Xj|i] equals Pr[SVj is visible if SVi is visible.]. We can compute the ensemble average of Xj|i in the same manner as E[Xi].

In this case, the visibility of a satellite, $SV_i$, is defined as the mean of $X_i$, that is, $$V_i = E[X_i] \qquad (5)$$

When a satellite is visible, the conditional visibilities of the other satellites with respect to this satellite depend on the probability that they are also visible. According to the present invention, the most visible satellite should be searched first and the most invisible satellite should be searched last or even not be searched when a satellite is determined to be visible or not. In addition, It can be more certain which satellite is visible after more satellite are searched.

TABLE 2

Conditional visibilities for SV 1

| $SV_i$ | 1 | 14 | 25 | 20 | 11 | 16 | 22 | 3 | 30 | 19 | 23 | 15 | 6 | 5 | 24 | 18 |
|---|---|---|---|---|---|---|---|---|---|---|---|---|---|---|---|---|
| $V_{i|1}$ | 1 | 0.59 | 0.56 | 0.17 | 0.06 | 0.05 | 0.04 | 0.04 | 0 | −0.04 | −0.05 | −0.16 | −0.17 | −0.19 | −0.25 | −0.33 |
| $SV_i$ | 9 | 21 | 13 | 4 | 7 | 2 | 28 | 27 | 8 | 10 | 26 | 29 | 12 | 17 | 31 | 32 |
| $V_{i|1}$ | −0.34 | −0.36 | −0.47 | −0.51 | −0.53 | −0.64 | −0.65 | −0.68 | −0.90 | −0.92 | −0.94 | −1 | −1 | −1 | −1 | −1 |

The conditional visibility $V_{j|i}$ of satellite $SV_j$ assuming that $SV_i$ is visible is determined based on the mean of $X_{j|i}$ as follows $$V_{j|i}=2\times E[X_{j|i}]-1 \qquad (6)$$

where we normalize the value so that the highest interrelationship (dependency) is indicated by the value "1" and the lowest interrelationship (dependency) is indicated by the value "−1".

An example of the conditional visibilities with respect to SV1 is shown in Table 2. In this example, it is assumed that satellites SV12, 17, 31 and 32 are not broadcast, and therefore the conditional visibilities thereof with any satellite are always −1. These four satellites SV12, 17, 31 and 32 will not be further discussed in this example. It can be seen that satellite SV1 excludes satellite SV29. Satellites SV14 and 25 are highly correlated with satellite SV1, while satellites SV 8, 10 and 26 are highly uncorrelated with SV1.

In one embodiment, initial weight factors $W_i$ for i=1, 2, ... ,32 in the weight factor table are all set to be 0. Whenever a satellite, SVi for example, is searched and determined to be visible or not, the weight factors $W_j$ for j=1, 2, . . . , i−1, i+1, . . . ,32 are updated based on the respective conditional visibilities $V_{j|i}$.

In the case that 32 satellites are in the candidate satellite list, conditional visibilities of a 32×32 matrix can be stored. That is, the conditional visibilities of all of the satellites with respect to each satellite are stored. However, in practice, it is not necessary to store the conditional visibilities $V_{j|i}$ of all the satellites with respect to a specific satellite. It is preferred that only the conditional visibilities of the most highly correlated two and the most highly uncorrelated two satellites with respect to a specific satellite are stored. For example, for satellite SV1, only the conditional visibilities of satellites S14, 25, 26, 29 are stored. Accordingly, all of the conditional visibilities will be stored as a 32×4 matrix. The size of the matrix can be changed from 32×1 to 32×32 as desired in this case.

In the embodiment, the first satellite to be searched is predetermined as satellite SV1. However, it can be any one of the possible satellites. The first satellite to be searched can also be selected randomly. After the first satellite is searched, the initial weight factor table is updated according to the searching result of this satellite, SV1 in this embodiment. If the satellite SV1 is hit, the weight factors of the other satellites SV2 to SV32 are increased according to their conditional visibilities with respect to SV1. That is, $W_j = W_j + V_{j|i}$ for j=2, 3, . . . ,32. On the other hand, the weight factors are decreased if the satellite SV1 is missed. That is, $W_j = W_j - V_{j|i}$ for j=2, 3, . . . ,32. Then, a second satellite to be searched is selected according to the updated weight factor table. For example, a satellite with the highest weight factor is selected to search. The sequent satellites to be searched are selected similarly.

The method of the embodiment in accordance with the present invention is now further described in conjunction with FIG. 1.

In accordance with the present invention, the satellite searching method is started with a cold start state (step S100). In step S110, a candidate satellite list, CandList, is initialized as {1, 2, . . . , 32} to search GPS satellites, for example. In step S120, the weight factor table is initialized. The weight factors of all the satellites are set to be 0, i.e. $W_i$=0 for i=1, 2, . . . , 32. In general, there are several physical channels in a receiver, which can search and track satellites. In one embodiment, we check and control each physical channel in a round robin way with the first channel assigned in step S130. In step S140, it is to determine if the current channel is idle, i.e., it is not searching or tracking a satellite. If the current channel is idle, it is determined whether the almanac and position/time fix information are available or not in step S150. If the information is available, the process is switched to warm start state (Step S160) and determine the satellite candidate according to the available information. Otherwise, the process will enter the method in accordance of the present invention. In step S200, it chooses and removes a satellite ID from CandList, which has the highest weight factor. In one embodiment, we use round-robin scheduling to search satellite. That is, all the satellites are searched only once in one round. Therefore, we check the list CandList in step S210. The list Candlist consists of the remaining satellites to search in the current round. If it is empty, the current round ends and the next round starts to search the un-acquired satellites. Therefore, we reassign satellite candidates in step S220. In step S230, the current idle channel is assigned to search the chosen satellite candidate. In step S240, the next physical channel is chosen. In step S150, if the current channel is not idle, it means that it is searching a satellite. Then we check the search result of the satellite, miss or hit, in Step S170 and S175, respectively. If the channel does not finish its searching, we will enter step S240 and choose the next channel. After a channel finishes its search for a satellite, the searching result whether the satellite is hit or missed will be issued. If the satellite is missed, we decrease the weight factors of the other satellites by amounts determined by the conditional visibilities in step S180. In another embodiment, the weight factors of all the satellites including the searched one are updated. Then the current channel can be used to search the next satellite and the process enters step S200 to choose another satellite to search. It is noted that the weight factors are updated in step S180 so that we can choose a satellite which has the highest weight factor or is equivalently most probable to be observed from CandList.

If the process finds that the current channel hits a satellite in step S190, the process will increase the weight factors of the satellites according to their conditional visibilities with respect to the hit one. In one embodiment, the weight factor of the hit satellite per se is not updated. In another embodiment, the weight factor of the hit satellite is also updated. The current channel will be used to tracking the hit satellite and so the process goes to step S240 directly to process the next channel.

Figures 1, 2:
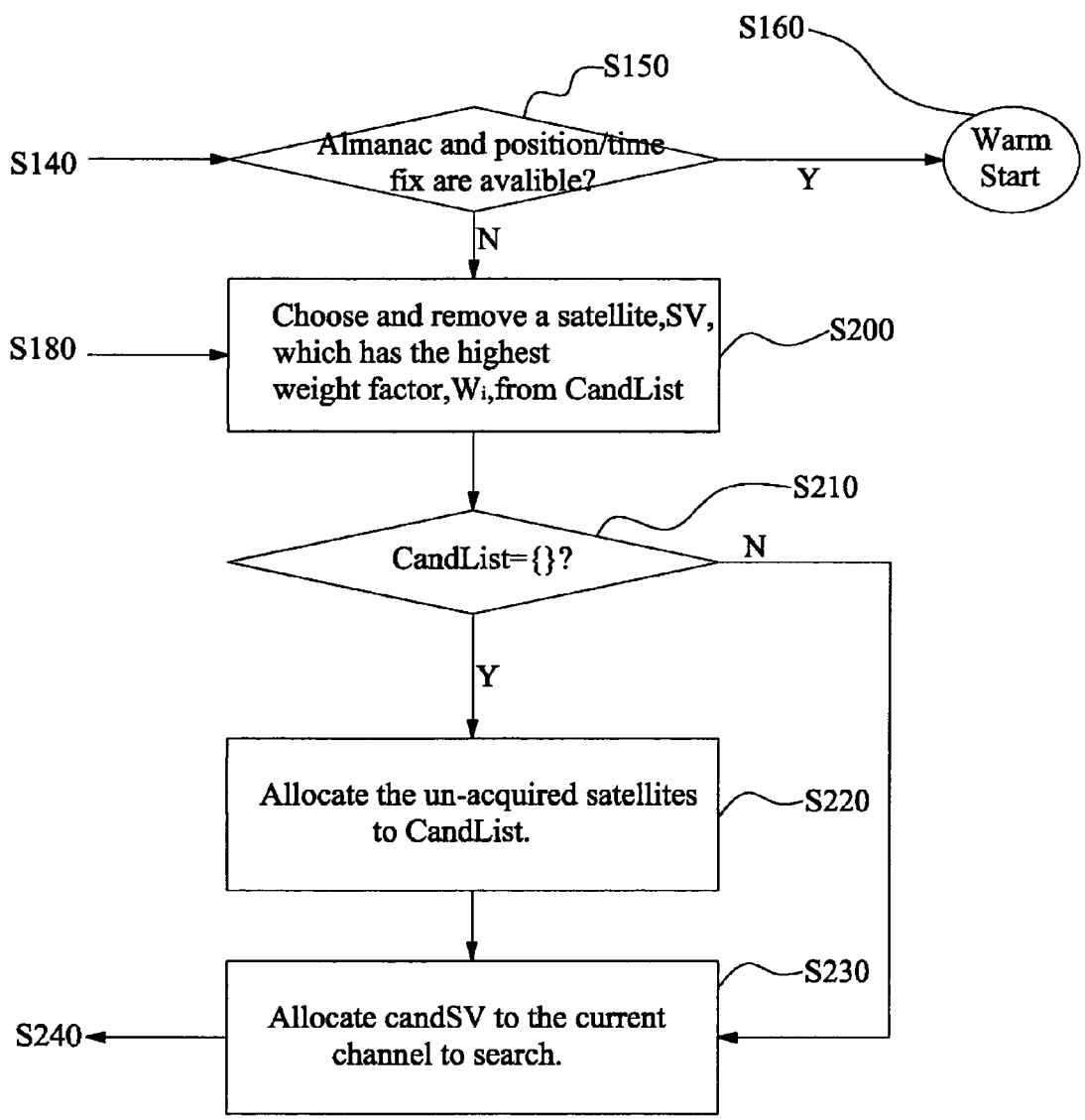
FIG. 2 shows an example of conditional visibility table used in the present invention.
Figure 3:
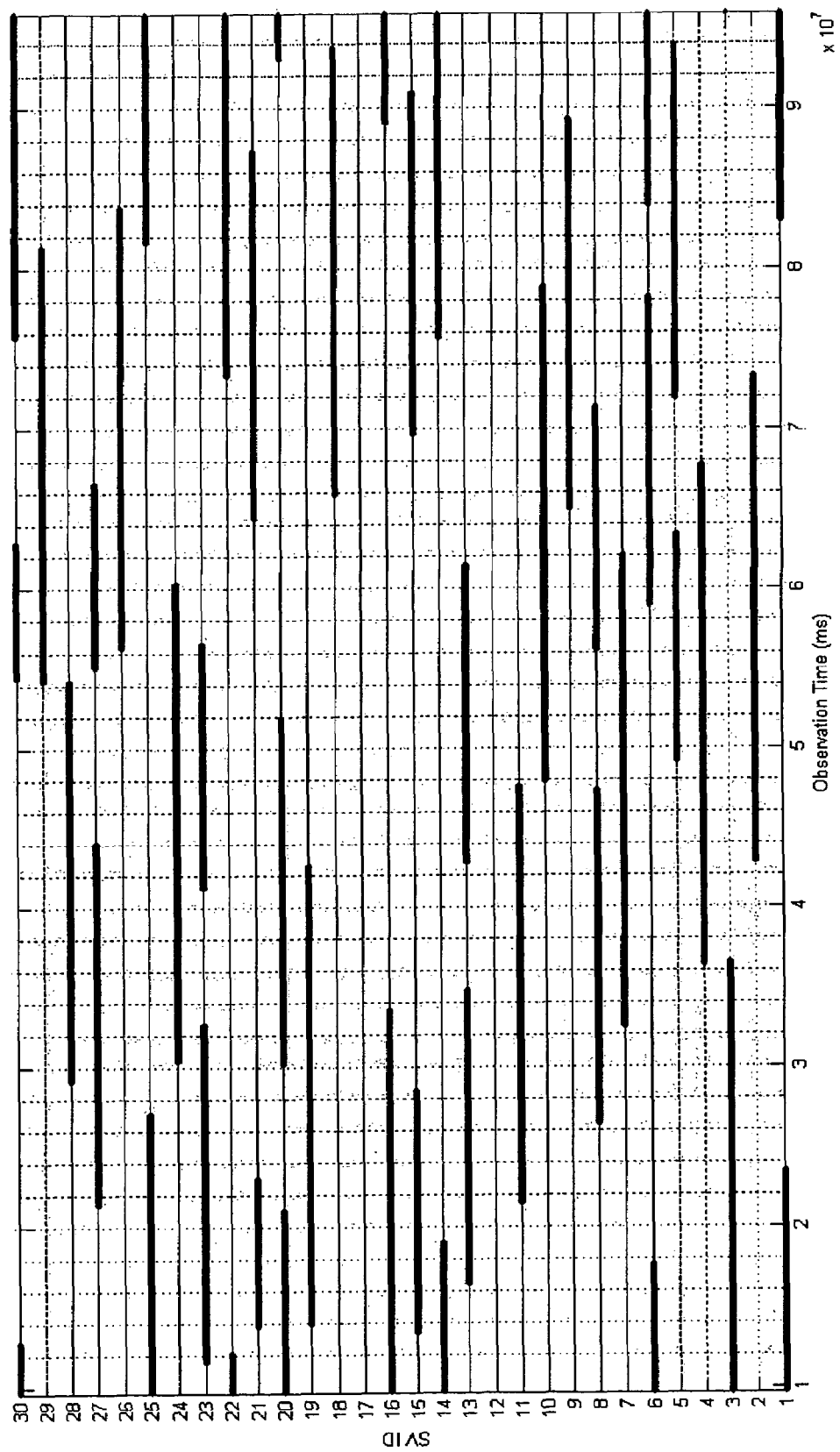
FIG. 3 shows an example of satellite visibility observation results at time sampling points for a fixed position.

The benefit of the method in accordance with the present invention will be illustrated by using the same numerical example as mentioned in the background. All the assumptions are the same. A conditional visibilities table to be used in this example is shown in FIG. 2. Assuming that the visible satellites are SV5, 9, 14, 15, 18, 21, 22, 26, 29 and 30. Satellites SV 12, 17, 31 and 32 are not broadcast and not considered accordingly. If the searching is started from satellite SV1 in step S200, the searching result should be "missed". It is noted that satellite SV1 is removed from the candidate satellite list after being searched. The initial weight factors of all the satellites (0 is this example) will be subtracted with the respective conditional visibilities of SV2 to SV32 with respect to SV1 (see Table 2) in step S180. It can be checked that the updated weight factor of satellite SV29 will be the highest, that is, "1". Accordingly, satellite SV29 will be selected as the next one to be searched in step S200. The searching result of satellite SV29 should be "hit" since SV29 is visible. Then the weight factors of other satellites will be added with the conditional visibilities of those satellites with respect to satellite SV29 in step S190. Once again, a satellite with the highest weight factor is selected to search in step S200. It is satellite SV26 in this example. Similarly, satellites SV 10, 8, 18, 9, 22, 15, 21, 5, 30, 6, and 14 are searched in this listed sequence, as shown in Table 3.

TABLE 3

A searching sequence determined according to the method of
the present invention.

| SV       | 1 | 29  | 26 | 10 | 8 | 18  | 9 | 22  | 15 | 21  | 5 | 30  | 6   | 14 |
|----------|---|-----|----|----|---|-----|---|-----|----|-----|---|-----|-----|----|
| Epoch(Ts)| 1 | 1.5 | 2  | 3  | 4 | 4.5 | 5 | 5.5 | 6  | 6.5 | 7 | 7.5 | 8.5 | 9  |
| Hit      | 0 | 1   | 1  | 0  | 0 | 1   | 1 | 1   | 1  | 1   | 1 | 1   | 0   | 1  |

(In Hit row, "0" indicates "miss", "1" indicates "hit")

Similar to the sequential search example described in the background, the scanning time $T_s$ is required for each satellite to search the whole Doppler and code phase uncertainty range. If a candidate satellite is not visible, a correlator misses it after searching time $T_s$. If a candidate satellite is visible, the correlator hits it after mean searching time $\frac{1}{2}T_s$. Further, it is assumed that the data demodulation bit error rate is zero. It takes 750 sec to receive almanac after the first hit, while 27.6 sec (mean) to receive ephemeris after the hit of one satellite. As can be seen from Table 3, the time to the first hit (i.e. satellite SV29 is hit) is 1.5 $T_s$ (=30.69 sec). The time to the first fix (i.e. the first four satellites SV29, 26, 18, 9 are hit) is about 5 $T_s$+27.6=129.9 sec. In addition, the time to find all the visible satellites is 9 $T_s$ (=184.14 sec). Compared to the conventional sequential satellite searching described previously, the satellite searching method in accordance with the present invention only takes about one-third of time.

As can be understood from the above descriptions and example, the time required to achieve the first hit, first fix and to find all the visible satellites can be significantly reduced by using the method in accordance with the present invention, especially in the cold start situation.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for searching a plurality of satellites in a Global Navigation Satellite System (GNSS), said method comprising steps of:
    providing a list of candidate satellites including satellites to be searched, each satellite in the list having a weight factor;
    searching for a first satellite from the list of candidate satellites;
    updating the weight factors of the respective satellites of the list in a first manner when the result of said searching step indicates that said first satellite is hit, and updating the weight factors of the respective satellites of the list in a second manner when the result of said searching step indicates that said first satellite is missed, based on interrelationships between said first satellite and the respective satellites;
    selecting a second satellite to be searched from the list of candidate satellites as a new first satellite according to the updated weight factors.

2. The method of claim 1, further comprising repeating the last three steps until a predetermined number of satellites have been found.

3. The method of claim 1, wherein the weight factors for the satellites are updated according to interrelated conditional visibilities between the respective satellites.

4. The method of claim 3, wherein for each satellite, the interrelated conditional visibilities include the interrelated conditional visibilities of all the other satellites with respect to the satellite.

5. The method of claim 3, wherein for each satellite, the interrelated conditional visibilities include the interrelated conditional visibilities of a predetermined number of satellites having higher dependencies with respect to the satellite.

6. The method of claim 3, wherein for each satellite, the conditional visibilities include the interrelated conditional visibility of a satellite having the highest dependency with respect to the satellite.

7. The method of claim 3, wherein the interrelated conditional visibilities include the interrelated conditional visibilities of all of the satellites with respect to each satellite.

8. The method of claim 1, wherein the weight factors for the satellites in the list are initially set as desired.

9. The method of claim 1, wherein the weight factors are stored in a weight factor table.

10. The method of claim 1, wherein the first satellite is removed from the list after said first satellite has been searched.

11. The method of claim 10, wherein the first satellite is re-included into the list after the list becomes empty if said first satellite is not hit in the searching step.

12. The method of claim 1, wherein in the updating step, the weight factors of the respective satellites are increased by the interrelationships of the respective satellites with respect to the first satellite when the result of said searching step indicates that said first satellite is hit, or decreased by the interrelationship of the respective satellites with respect to the first satellite when the result of said searching step indicates that said first satellite is missed.

13. The method of claim 1, wherein the weight factor of the searched satellite per se is not updated in the updating step.

14. The method of claim 1, wherein the weight factor of the searched satellite is also updated in the updating step.

* * * * *

UNITED STATES PATENT AND TRADEMARK OFFICE
CERTIFICATE OF CORRECTION

PATENT NO. : 7,612,714 B2  Page 1 of 1
APPLICATION NO. : 11/392976
DATED : November 3, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 190 days.

Signed and Sealed this

Nineteenth Day of October, 2010

David J. Kappos
*Director of the United States Patent and Trademark Office*